United States Patent
Garbald (10) Patent No.: US 12,239,049 B2
(45) Date of Patent: Mar. 4, 2025

(54) HEADER WITH FLEXIBLE CUTTER BAR ASSEMBLY

(71) Applicant: MACDON INDUSTRIES LTD, Winnipeg (CA)

(72) Inventor: Jann Garbald, Winnipeg (CA)

(73) Assignee: MacDon Industries LTD., Winnipeg (CA)

( * ) Notice: Subject to any disclaimer, the term of this patent is extended or adjusted under 35 U.S.C. 154(b) by 743 days.

(21) Appl. No.: 17/406,932

(22) Filed: Aug. 19, 2021

(65) Prior Publication Data

US 2023/0056842 A1   Feb. 23, 2023

(51) Int. Cl.
| A01D 41/14 | (2006.01) |
| A01D 34/14 | (2006.01) |
| A01D 34/17 | (2006.01) |
| A01D 41/06 | (2006.01) |
| A01D 57/20 | (2006.01) |

(52) U.S. Cl.
CPC .......... *A01D 41/14* (2013.01); *A01D 34/145* (2013.01); *A01D 41/06* (2013.01)

(58) Field of Classification Search
CPC .... A01B 63/008; A01B 63/108; A01D 41/14; A01D 41/06; A01D 41/145; A01D 41/141; A01D 41/127; A01D 41/144; A01D 34/145; A01D 34/283; A01D 34/13; A01D 34/14; A01D 34/135; A01D 57/20; A01D 57/26
See application file for complete search history.

(56) References Cited

U.S. PATENT DOCUMENTS

| 3,683,601 | A | | 8/1972 | Van Der Lely |
| 4,198,803 | A | * | 4/1980 | Quick .................... A01D 57/26 56/296 |
| 4,446,683 | A | | 5/1984 | Rempel et al. |
| 6,675,568 | B2 | * | 1/2004 | Patterson ............... A01D 41/14 56/228 |
| 7,478,522 | B1 | * | 1/2009 | Lovett ................... A01D 41/14 56/296 |
| 10,426,088 | B2 | * | 10/2019 | Mossman ............ A01D 41/142 |
| 10,462,968 | B2 | | 11/2019 | Shearer |

(Continued)

FOREIGN PATENT DOCUMENTS

| SU | 567423 | 8/1977 |
| SU | 993862 | 2/1983 |

*Primary Examiner* — Thomas B Will
*Assistant Examiner* — Robert E Pezzuto
(74) *Attorney, Agent, or Firm* — Miller Canfield (57) ABSTRACT

A header for harvesting agricultural crops includes a cutter bar assembly coupled to a header frame, the cutter bar assembly flexible upwardly and downwardly relative to the header frame between opposite ends thereof for contouring to the field. The cutter bar assembly includes a guard bar extending across a front portion of the header frame between the opposite ends thereof, the guard bar split into at least a first lateral section and a second lateral section operatively coupled at a guard bar joint. A protruding element extending from the first lateral section is received by a receiving element on the second lateral section at the guard bar joint to horizontally align the first and second lateral sections of the guard bar between the opposite ends of the header frame while allowing relative lateral movement therebetween during upward and downward flexing of the cutter bar assembly.

22 Claims, 13 Drawing Sheets

(56) References Cited

U.S. PATENT DOCUMENTS

| | | | |
|---|---|---|---|
| 10,959,374 B2* | 3/2021 | Duerksen | A01D 41/141 |
| 2008/0295473 A1* | 12/2008 | Tippery | A01D 41/144 56/153 |
| 2018/0027728 A1 | 2/2018 | Honey et al. | |
| 2019/0230858 A1* | 8/2019 | Shearer | A01D 41/141 |

* cited by examiner

FIG. 12

# HEADER WITH FLEXIBLE CUTTER BAR ASSEMBLY

BACKGROUND OF THE INVENTION

1. Field of the Invention

The present invention relates to a header for harvesting agricultural crops.

2. Description of Related Art

Headers for use in a field to harvest agricultural crops are known in the art. Typical headers include a header frame with a front portion and a rear portion, each extending longitudinally between opposite ends. A cutter bar assembly is operatively coupled to the header frame, and the cutter bar assembly is often flexible upwardly and downwardly relative to the header frame along a generally vertical plane between the opposite ends of the header frame for contouring to the field. The cutter bar assembly includes a guard bar extending across the front portion of the header frame between the ends thereof and a reciprocating sickle bar slidably mounted to, and extending longitudinally across, the guard bar. The cutter bar assembly further includes a plurality of knife guards fixedly secured to the guard bar to intersect with the sickle bar for cutting the crops to be harvested as the sickle bar reciprocates longitudinally between the opposite ends of the header frame. However, guard bars on headers known in the art can stretch or buckle as the cutter bar assembly flexes upwardly and downwardly relative to the header frame. Such stretching or buckling of the guard bar can potentially lead to unintended wear or deformation of the guard bar, which can ultimately compromise harvesting efficiency.

SUMMARY OF THE INVENTION

According to one aspect of the invention, a header is provided for use in a field to harvest agricultural crops. The header includes a header frame with a front portion and a rear portion, each extending longitudinally between opposite ends. A cutter bar assembly is coupled to the header frame, and the cutter bar assembly is flexible upwardly and downwardly relative to the header frame along a generally vertical plane between the opposite ends of the header frame for contouring to the field. The cutter bar assembly includes a guard bar extending across the front portion of the header frame between the ends thereof. The guard bar is split into at least a first lateral section and a second lateral section at a guard bar joint. The first lateral section of the guard bar is operatively coupled to the second lateral section of the guard bar at the guard bar joint to horizontally align the first and second lateral sections of the guard bar between the opposite ends of the header frame while allowing relative lateral movement therebetween during upward and downward movement of the cutter bar assembly. The cutter bar assembly further includes a reciprocating sickle bar slidably mounted to and extending longitudinally across the guard bar. A plurality of knife guards are fixedly secured to the guard bar and intersect with the sickle bar for cutting the crops to be harvested as the sickle bar reciprocates longitudinally between the opposite ends of the header frame.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
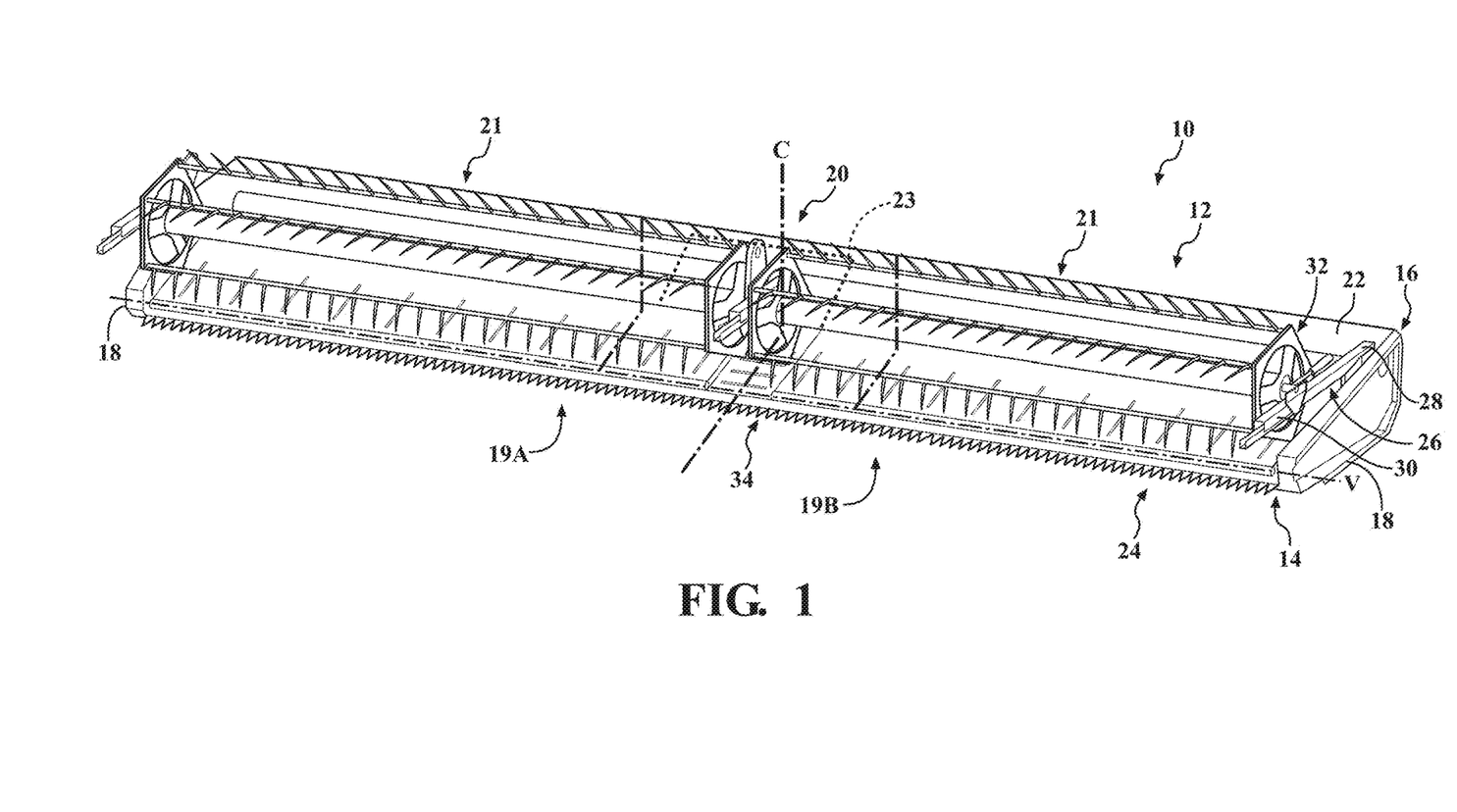
FIG. 1 is a perspective view of a header according to a primary embodiment of the present invention.
Figure 2:
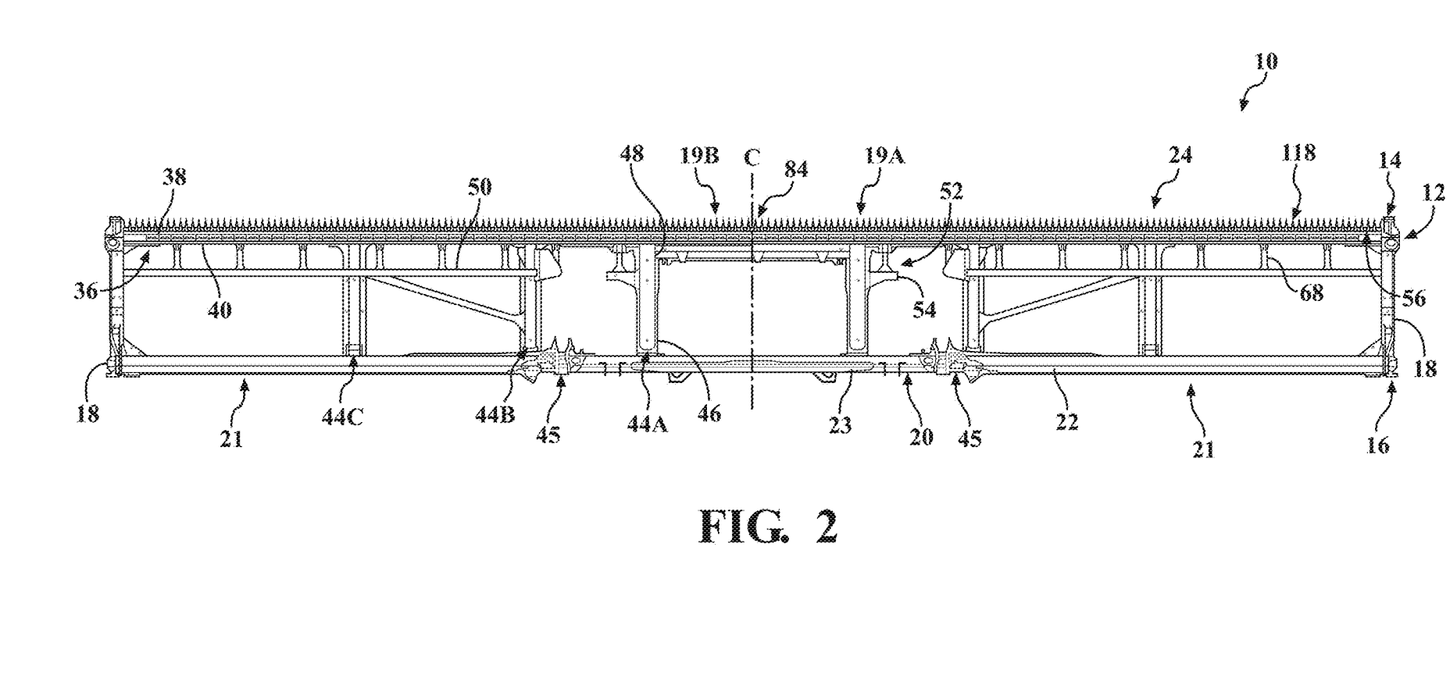
FIG. 2 is a fragmentary top view of the header of FIG. 1 showing a header frame and a cutter bar assembly.

Referring to the Figures, wherein like numerals indicate like or corresponding parts throughout the several views, a header for use in a field to harvest agricultural crops is shown generally at 10. The header 10 includes a header frame 12 with a front portion 14 and a rear portion 16 each extending laterally between a pair of opposite ends 18. The header frame 12 is divided into a middle frame section 20 pivotally coupled between a pair of side wing sections 21, as shown in FIGS. 1 and 2. The side wing sections 21 are pivotable upwardly and downwardly relative to the middle frame section 20 to contour to the field as the header 10 is moved across the field for harvesting crops. Alternatively, depending on the overall size and intended use of the header 10, the header 10 may include any suitable number of sections, including a single section as shown in FIG. 3, without varying the scope of the invention.

Figure 3:
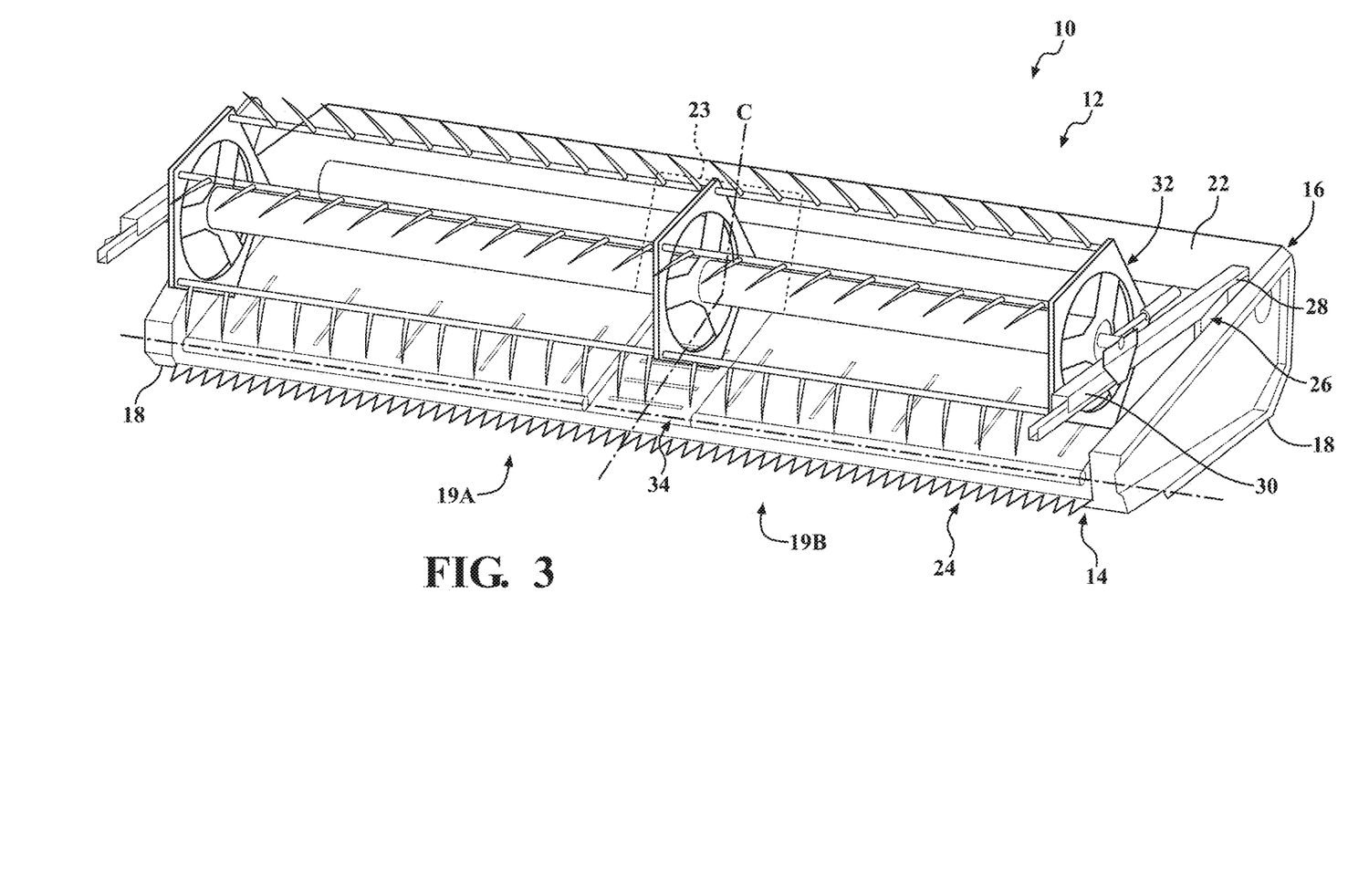
FIG. 3 is a perspective view of a header according to an alternative embodiment of the present invention.

Referring to FIGS. 1-3, a center plane C bisects the header frame 12 substantially equidistant between the opposite ends 18 thereof to define two substantially similar sides 19A, 19B of the header 10. A rear wall 22 extends substantially vertically from the rear portion 14 of the header frame 12 between the opposite ends 18 thereof. The rear wall 22 includes an aperture 23 for transferring crops away from the header 10, generally for further processing by an agricultural machine such as a combine or for creation of windrows by a swather. Referring to FIGS. 1-5, a vertical plane V extends between the opposite ends 18 of the header frame 12, and a cutter bar assembly 24 is operatively coupled to the front portion 14 of the header frame 12 between the opposite ends 18 thereof for cutting the crops to be harvested. The cutter bar assembly 24 is flexible upwardly and downwardly relative to the header frame 12 along vertical plane V for contouring to the field in coordination with the side wing sections 21 to optimally cut the crops. Referring to FIG. 1, the header 10 further includes at least one pair of support arms 26 which extend between a proximal end 28 coupled to the rear portion 16 of the header frame 12 and an opposite distal end 30 spaced above the front portion 14 of the header frame 12. At least one crop pick-up reel 32 is slidably and rotatably coupled between the distal ends 30 of the support arms 26 for engaging the crops to be harvested. Additionally, a draper belt assembly, shown generally at 34, is rotatably supported by the header frame 12 for transporting cut crops to the aperture 23 in the rear portion 16 of the header frame 12.

Figure 4:
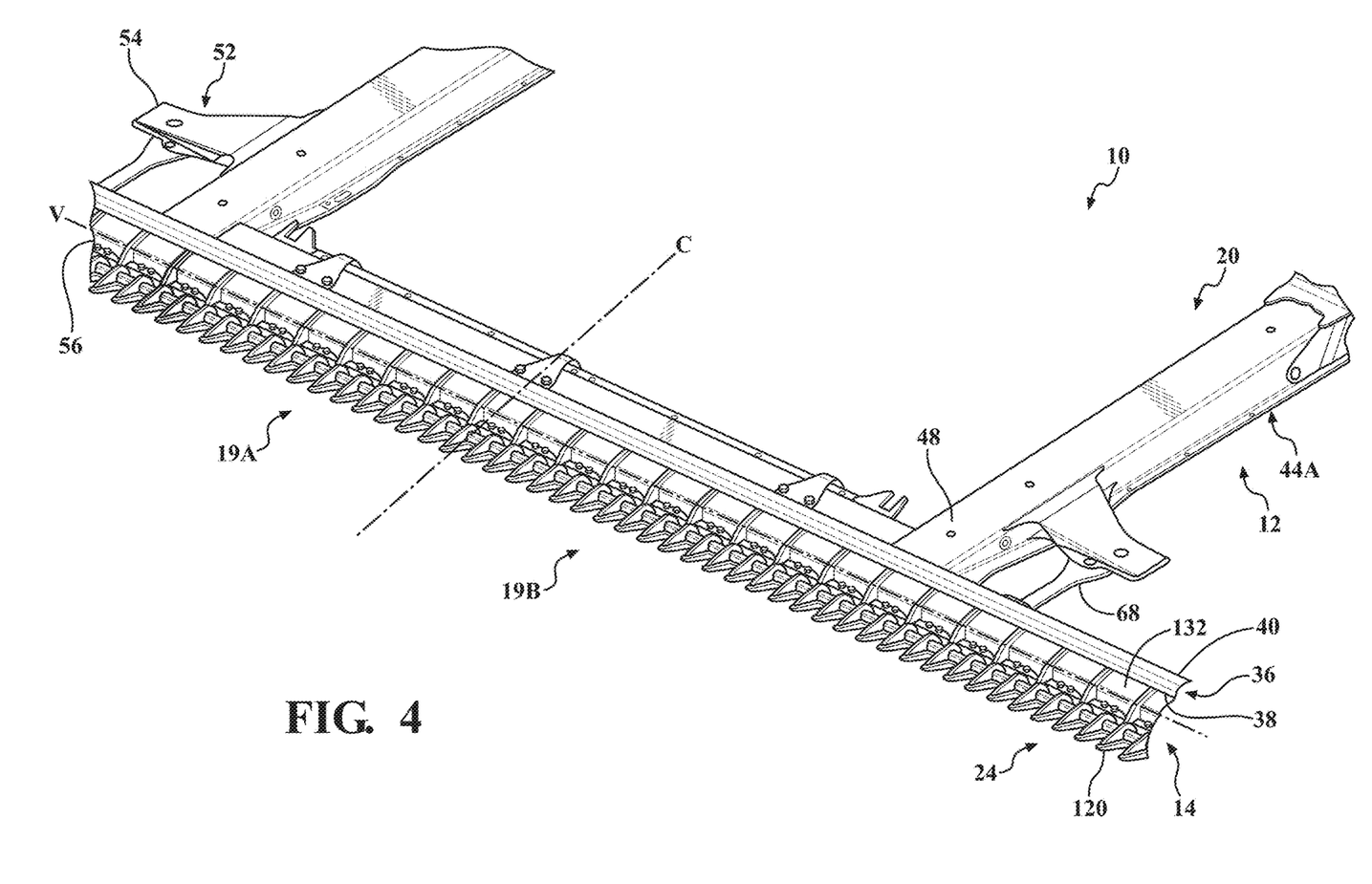
FIG. 4 is an enlarged fragmentary perspective view of the header of FIG. 1 showing a plurality of deflectors coupled to the header frame.
Figure 5:
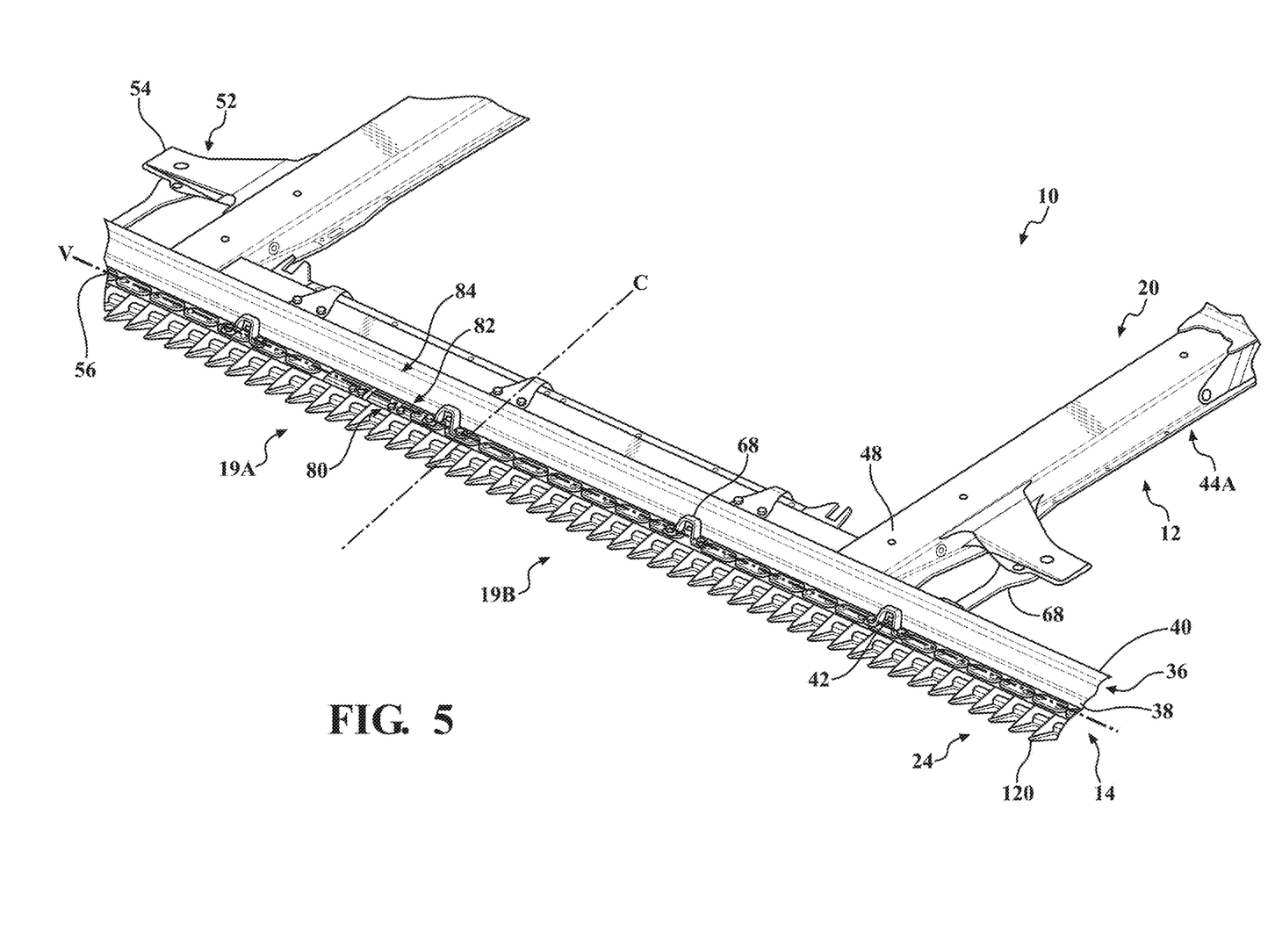
FIG. 5 is an enlarged fragmentary perspective view of the header of FIG. 1 with the plurality of deflectors removed to show a guard bar.
Figure 6:
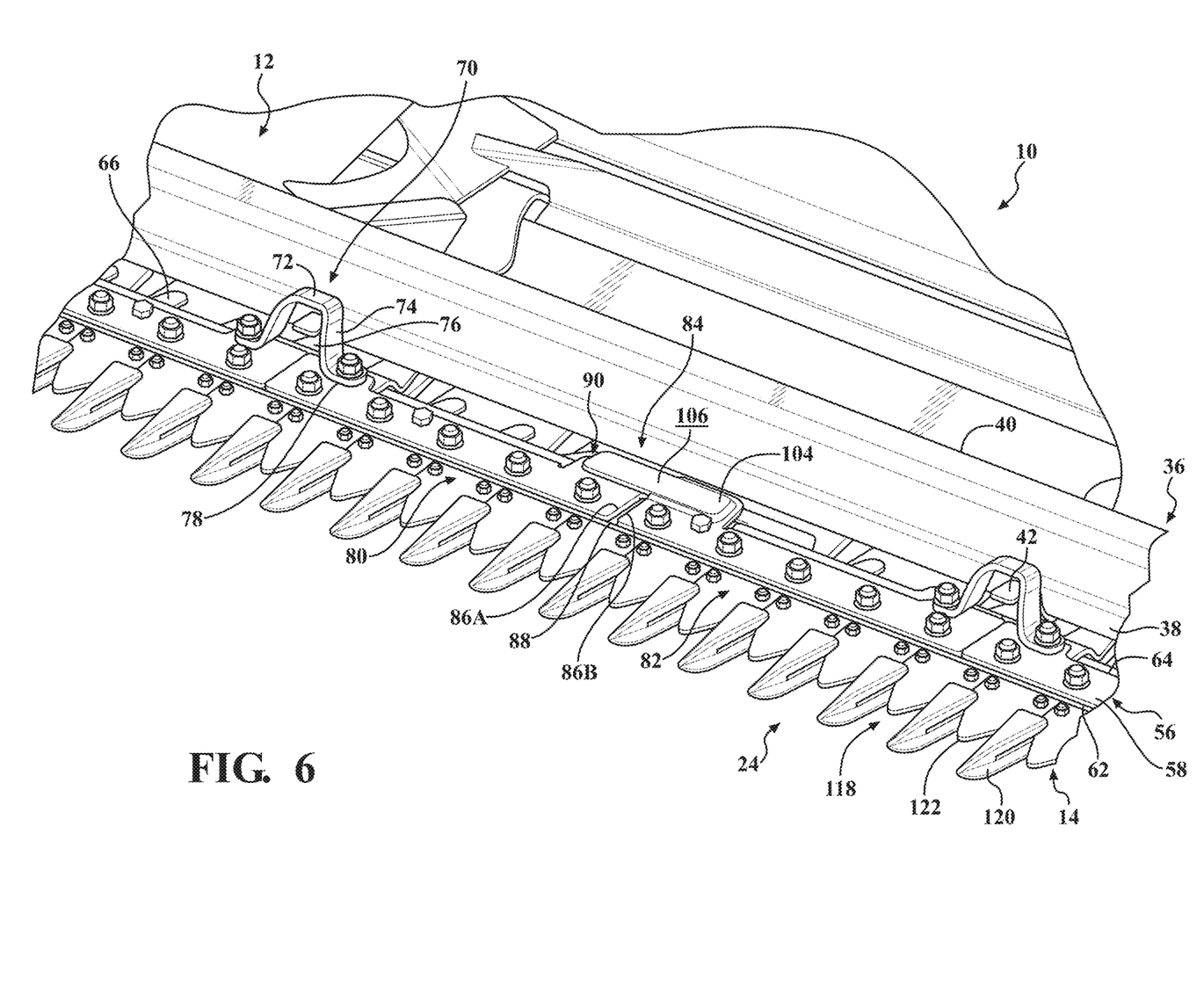
FIG. 6 is an enlarged fragmentary perspective view of the header of FIG. 1 showing a first lateral section of the guard bar and a second lateral section of the guard bar operatively coupled at a guard bar joint.

Referring to FIGS. 4-6, the header frame 12 includes a support bar 36 extending across the front portion 14 thereof and fixedly coupled to each of the opposite ends 18 of the header frame 12. The support bar 36 includes a front-facing side 38 and an opposite rear-facing side 40, wherein the front-facing side 38 includes a plurality of stationary fingers 42 spaced thereacross and extending forwardly therefrom. A plurality of substantially parallel support legs 44 are spaced laterally apart between the opposite ends 18 of the header frame 12 and extend between an aft end 46 fixedly coupled to the rear portion 16 of the header frame 12 and a fore end 48 fixedly coupled to the rear-facing side 40 of the support bar 36, as shown in FIG. 2. In the embodiment of the header 10 shown in the Figures, the plurality of support legs 44 includes a center support leg 44A, an intermediate support leg 44B, and an outer support leg 44C positioned on each side 19A, 19B of the header 10. The center support legs 44A are each positioned adjacent to center plane C, the outer support legs 44C are each spaced laterally from the respective opposite ends 18 of the header frame 12, and the intermediate support legs 44B are each positioned between the respective center and outer support legs 44A, 44C. Referring to FIG. 2, a wing pivoting mechanism, shown generally at 45, is operatively coupled between each pair of center support legs 44A and intermediate support legs 44B as is known in the art to allow the side wing sections 21 to pivot upwardly and downwardly relative to the middle frame section 20 for contouring of the header 10 to the field.

Referring to FIG. 2, the header frame 12 further includes an intermediate beam 50 on each side 19A, 19B thereof, the intermediate beams 50 positioned behind and extending substantially parallel to the support bar 36. Each intermediate beam 50 is coupled between the respective opposite end 18 of the header frame 12 and the respective intermediate support leg 44B. Referring to FIGS. 2, 4, and 5, an intermediate beam segment 52 extends laterally from each of the center support legs 44A and terminates at a lateral end 54 spaced apart from the respective intermediate support leg 44B. However, it is to be appreciated that the header 10 may include any number or configuration of support legs 44, intermediate beams 50, and intermediate beam segments 52 depending on the overall size and intended use of the header 10 without varying the scope of the invention.

Referring to FIGS. 2 and 4-8, the cutter bar assembly 24 includes a guard bar 56 operatively coupled between the opposite ends 18 of the header frame 12 for supporting and mounting various components of the cutter bar assembly 24, as described in further detail below. The guard bar 56 is positioned in front of the support bar 36 and includes a substantially planar top side 58 and a substantially planar bottom side 60 with opposite front and rear edges 62, 64. A plurality of support fingers 66, shown in FIG. 7, extend rearwardly and downwardly from the rear edges 64 of the guard bar 56. Referring to FIGS. 2, 4, and 5, the guard bar 56 is additionally coupled to the intermediate beams 50 and the intermediate beam segments 52 by a plurality of flexible mounting components 68. Each mounting component 68 extends under the support bar 36 between the respective intermediate beam 50 or intermediate beam segment 52 and the bottom side 60 of the guard bar 56. The mounting components 68 are adapted to flex upwardly and downwardly relative to the header frame 12 to accommodate the upward and downward flexing of the cutter bar assembly 24 for contouring of the cutter bar assembly 24 to the field. Further details on the mounting components 68 are described in U.S. Pat. No. 10,462,968, the disclosure of which is hereby incorporated by reference in its entirety.

Figure 8:
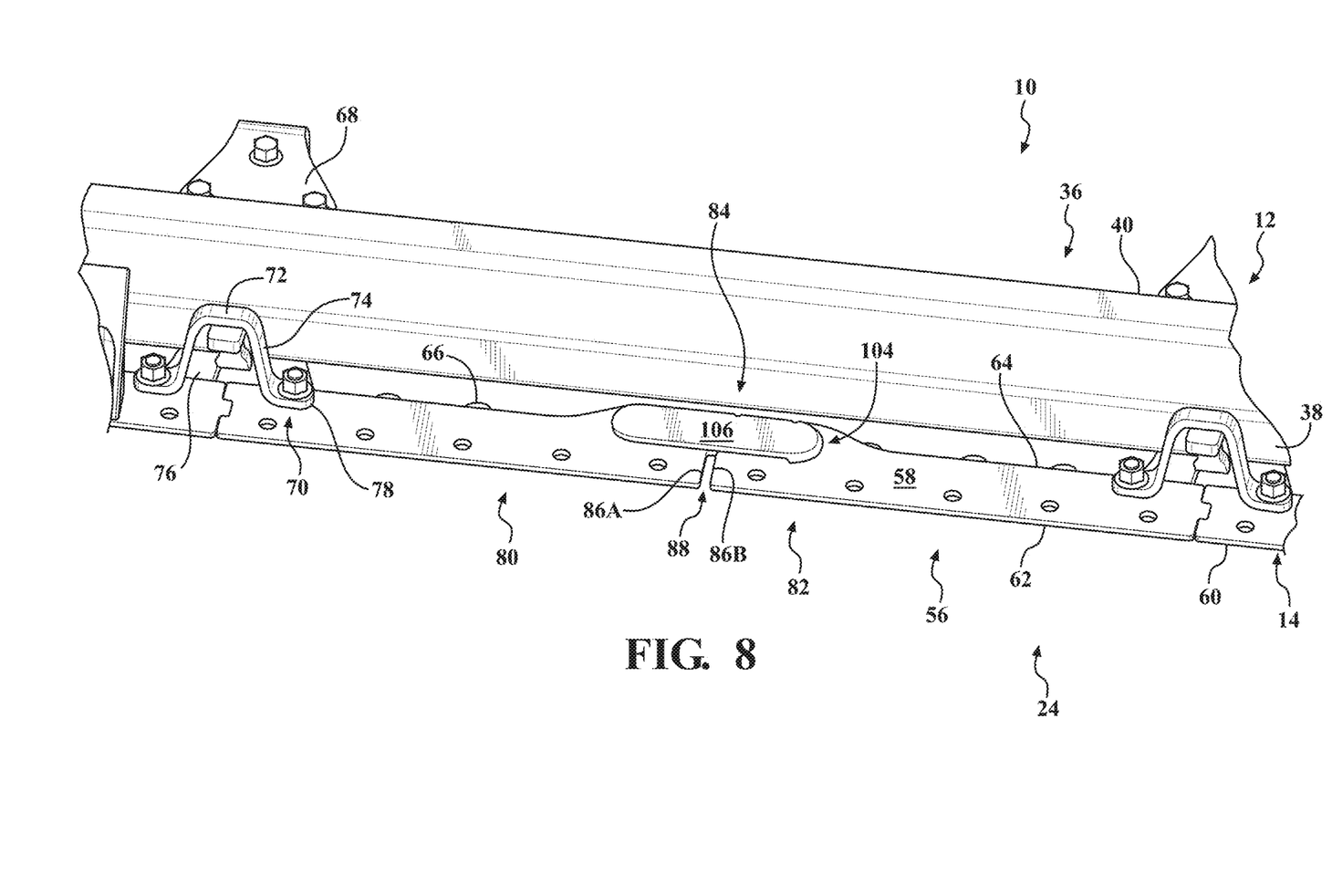
FIG. 8 is an enlarged fragmentary perspective view of the header of FIG. 1 with a plurality of components of the cutter bar assembly removed to show the guard bar joint.

Referring to FIGS. 6 and 8, the guard bar 56 includes a plurality of hanger brackets 70 fixedly coupled thereto. Each hanger bracket 70 is arranged for receiving one of the fingers 42 extending from the front-facing side 38 of the support bar 36 for limiting upward and downward movement of the cutter bar assembly 24 relative to support bar 36 of the header frame 12. Each hanger bracket 70 has a generally U-shaped cross-section that is inverted relative to the guard bar 56, the U-shaped cross-section defined by a horizontal upper portion 72 extending laterally between downwardly-extending outer side walls 74 with an interior space 76 therebetween. A terminal flanged portion 78 on each of the outer side walls 74 is fixedly coupled to the top side 58 of the guard bar 56. Referring to FIG. 6, the interior space 76 of each hanger bracket 70 receives one of the fingers 42 extending from the front-facing side 38 of the support bar 36. The fingers 42 remain stationary relative to the support bar 36 of the header frame 12 while the hanger brackets 70 move vertically with the guard bar 56 during upward and downward flexing of the cutter bar assembly 24. Engagement of the upper portion 72 of the hanger brackets 70 with the fingers 42 defines a maximum downward flex of the cutter bar assembly 24 relative to the support bar 36 of the header frame 12, and engagement of the top side 58 of the guard bar 56 with the fingers 42 defines a maximum upward flex of the cutter bar assembly 24 relative to the support bar 36 of the header frame 12. The cutter bar assembly 24 is therefore prevented from further vertical movement relative to the support bar 36 of the header frame 12 once the upper portion 72 of the hanger brackets 70 or the top side 58 of the guard bar 56 engages the fingers 42.

Figure 7:
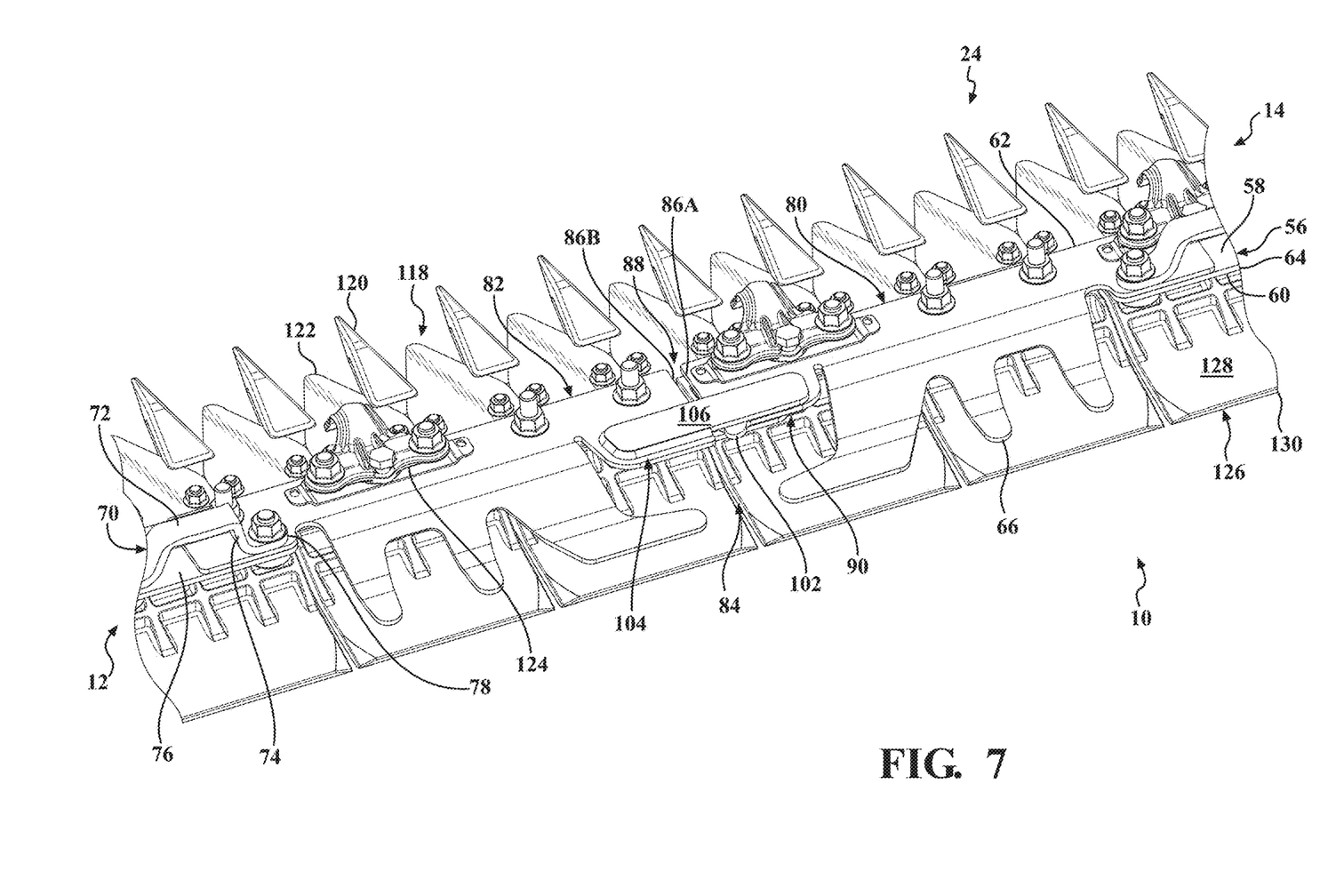
FIG. 7 is an alternative enlarged fragmentary perspective view of the header of FIG. 1 further showing the first and second lateral sections of the guard bar operatively coupled at the guard bar joint.
Figure 9A:
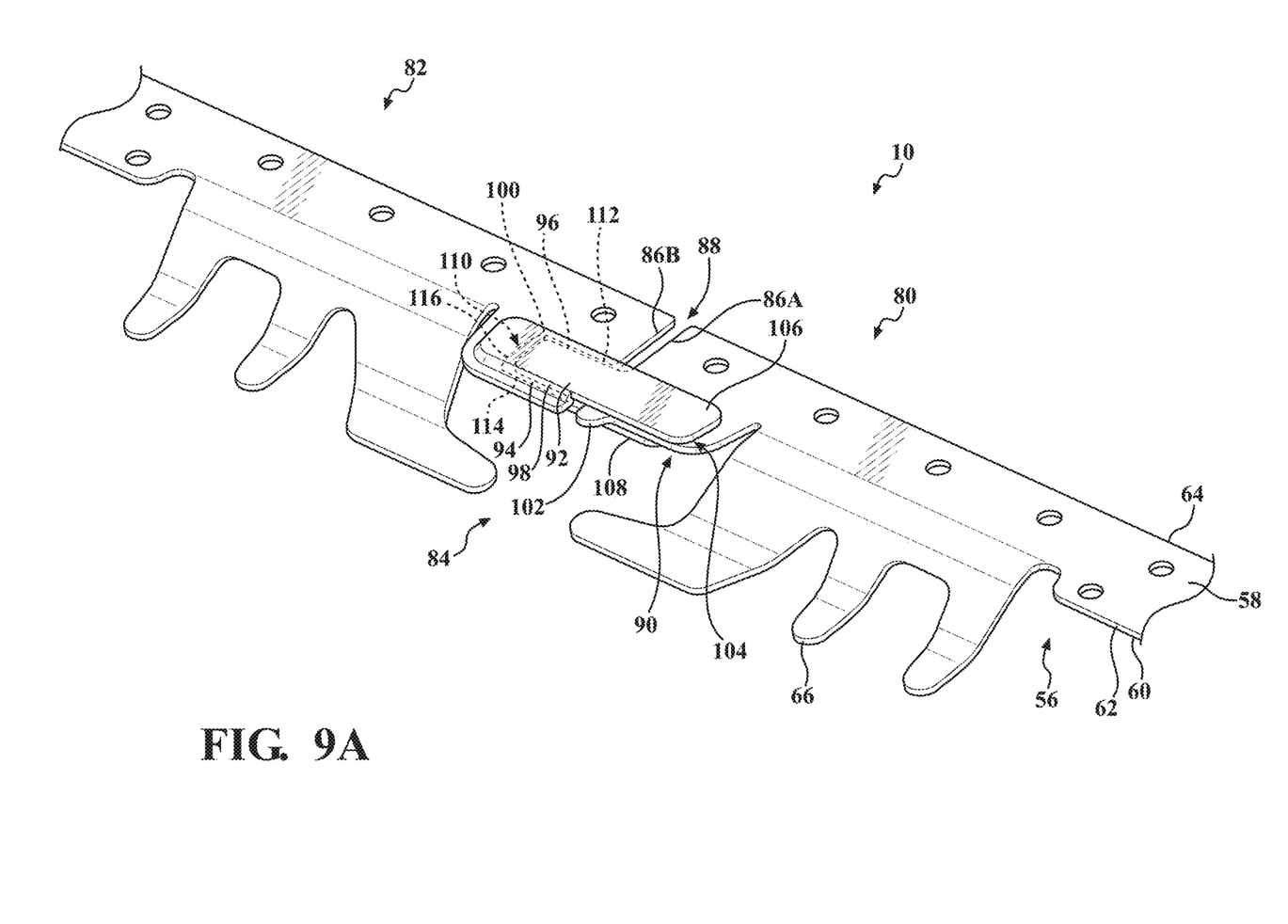
FIG. 9A is an enlarged fragmentary perspective view of the header of FIG. 1 showing the first and second lateral sections of the guard bar operatively coupled at the guard bar joint.
Figure 9B:
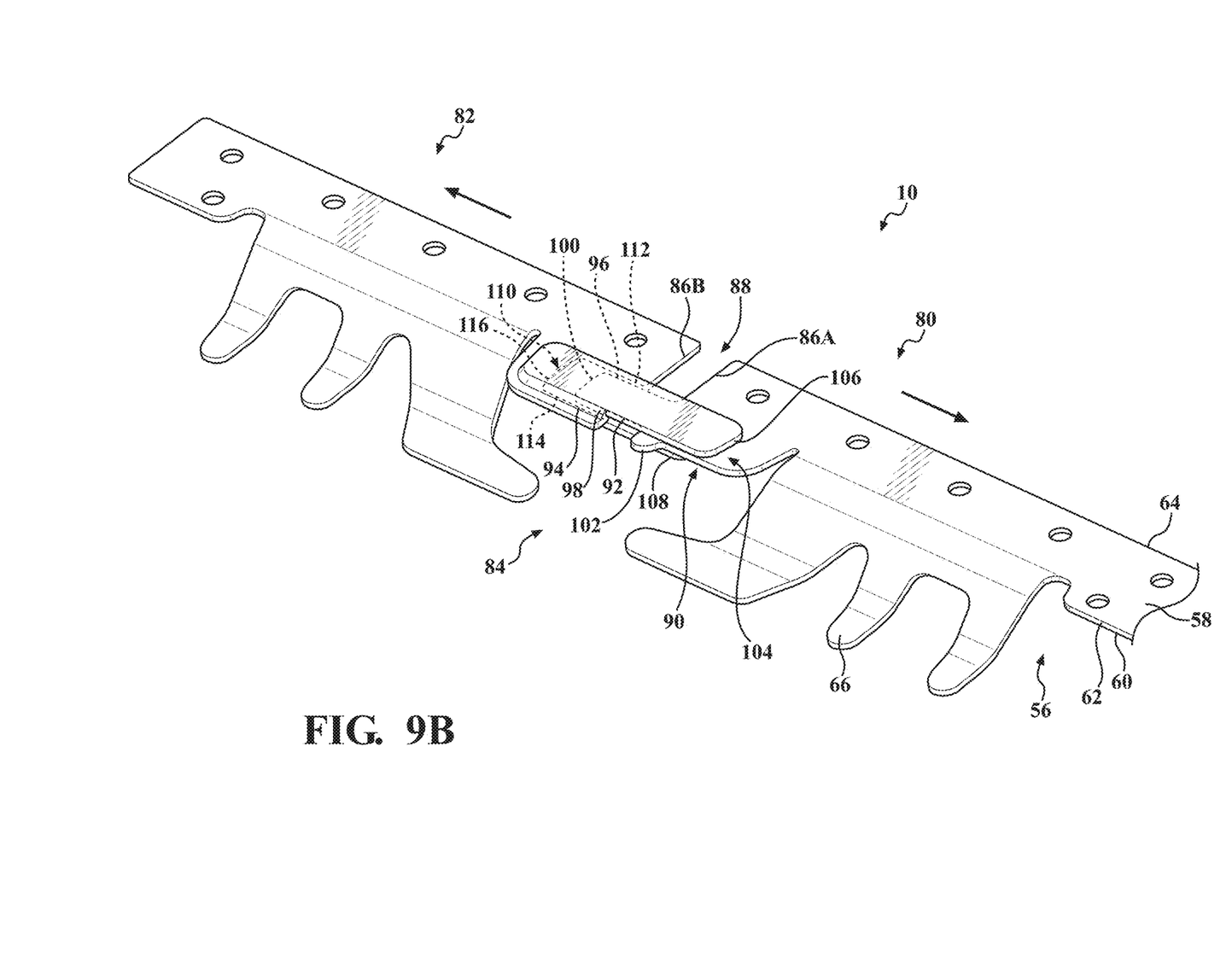
FIG. 9B is an enlarged fragmentary perspective view of the header of FIG. 1 further showing the first and second lateral sections of the guard bar operatively coupled at the guard bar joint and moving laterally relative to each other.

Referring to FIGS. 6-8, the guard bar 56 is split into a first lateral section 80 and a second lateral section 82 at a guard bar joint 84 positioned at, or generally adjacent to, center plane C for allowing lateral movement of the guard bar 56 as the cutter bar assembly 24 flexes upwardly and downwardly relative to the support bar 36 of the header frame 12. Although the guard bar 56 as shown in the Figures is split into the first and second lateral sections 80, 82 at the guard bar joint 84, it is to be appreciated that the guard bar 56 can be split into any suitable number of sections at a corresponding number of guard bar joints without varying the scope of the invention. Referring to FIGS. 8, 9A, and 9B, the first and second lateral sections 80, 82 of the guard bar 56 each terminate at an opposing inner edge 86A, 86B adjacent to the guard bar joint 84, the inner edges 86A, 86B defining a gap 88 therebetween. As the first and second lateral sections 80, 82 move laterally toward and away from each other during flexing of the cutter bar assembly 24, the gap 88 between the inner edges 86A, 86B correspondingly decreases or increases, as shown in FIGS. 9A and 9B, thereby helping to prevent stretching or buckling of the guard bar 56 that could occur in a conventional cutter bar assembly.

Figure 10:
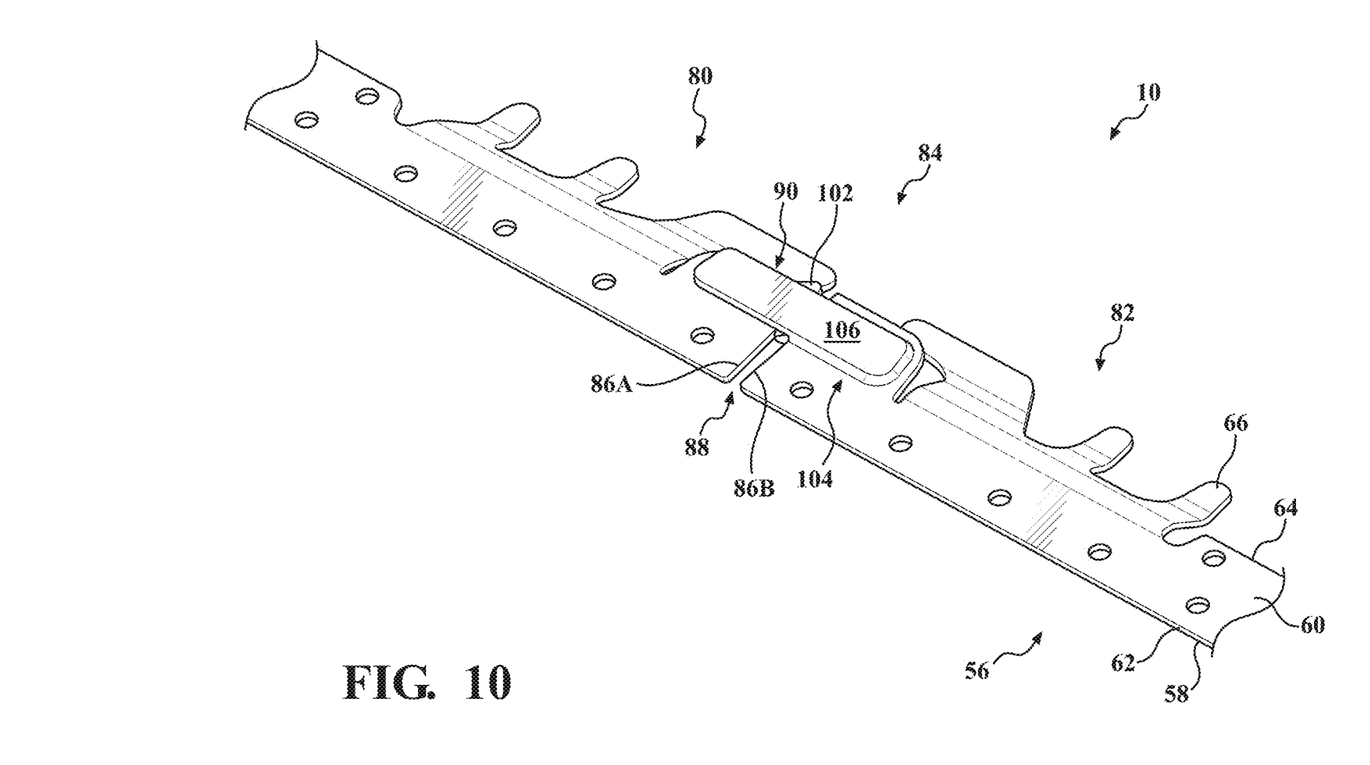
FIG. 10 is an enlarged fragmentary perspective view of the header of FIG. 1 further showing the first and second lateral sections of the guard bar operatively coupled at the guard bar joint.
Figure 11:
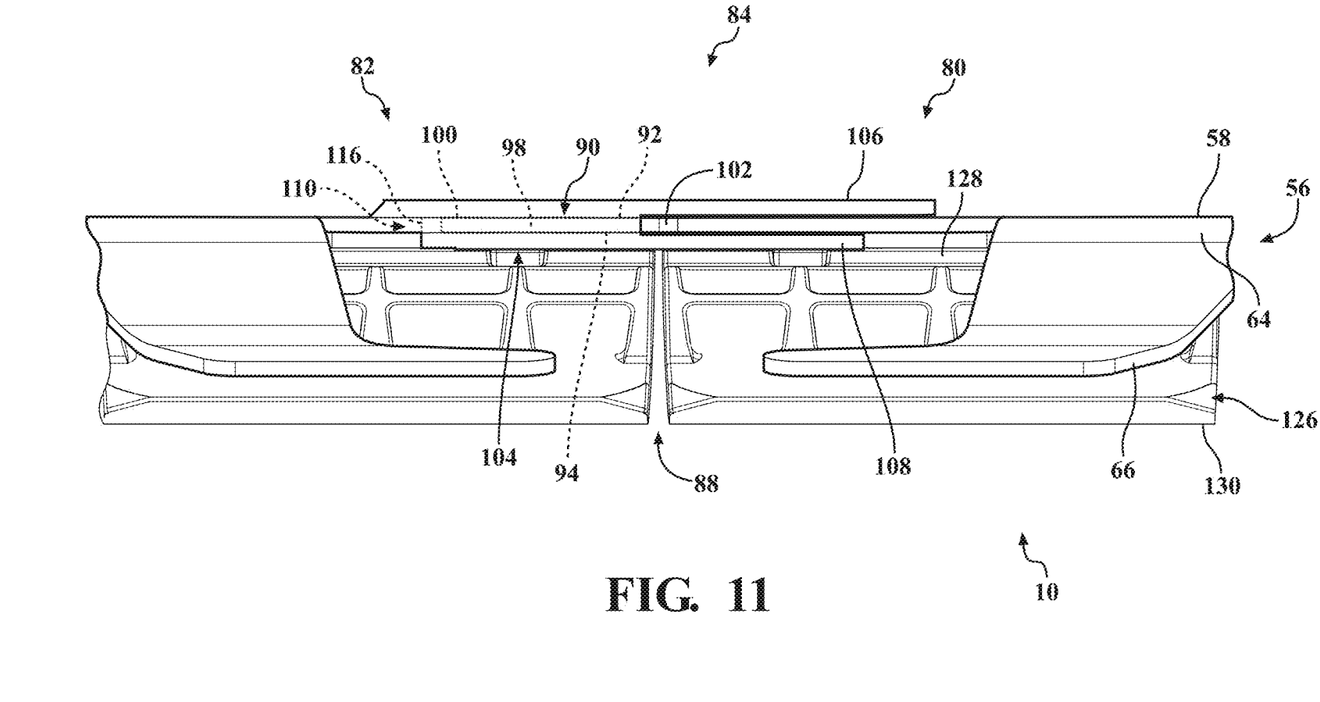
FIG. 11 is an enlarged fragmentary front view of the header of FIG. 1 showing a receiving element of the second lateral section of the guard bar receiving a protruding element of the first lateral section of the guard bar.

Referring to FIGS. 9A, 9B, and 10, the first lateral section 80 of the guard bar 56 is operatively coupled to the second lateral section 82 of the guard bar 56 at the guard bar joint 84 for maintaining horizontal alignment of the first and second lateral sections 80, 82 while allowing lateral movement therebetween. The first lateral section 80 includes a protruding element 90 extending laterally across the gap 88 from the inner edge 86A thereof, wherein the protruding element 90 is positioned adjacent to the rear edge 64 of the guard bar 56. Referring to FIGS. 9A, 9B, and 11, the protruding element 90 has substantially planar top and bottom sides 92, 94 that extend between parallel front and rear edges 96, 98 and terminate at a distal edge 100. The protruding element 90 further includes a stop feature 102 extending rearwardly from the rear edge 98 thereof, as described in further detail below. Referring to FIGS. 9A and 9B, the stop feature 102 is positioned on the rear edge 98 of the protruding element 90 generally opposite the inner edge 86A of the first lateral section 80 of the guard bar 56.

Referring to FIGS. 9A, 9B, and 11, the protruding element 90 is slidably received by a receiving element 104 positioned on the inner edge 86B of the second lateral section 82 of the guard bar 56. The receiving element 104 includes upper and lower substantially planar alignment elements 106, 108 extending laterally across the gap 88 from the inner edge 86B thereof. The upper and lower alignment elements 106, 108 slidably engage the respective top and bottom sides 92, 94 of the protruding element 90 such that the protruding element 90, and therefore, the first lateral section 80 of the guard bar 56, is prevented from moving vertically relative to the second lateral section 82 of the guard bar 56. Referring again to FIGS. 9A, 9B, and 11, the receiving element 104 includes a recessed pocket 110 extending laterally from the inner edge 86B of the second lateral section 82 for further receiving the protruding element 90. The pocket 110 is defined by a pair of opposing front and rear side walls 112, 114 and a lateral end 116 vertically bound by the upper and lower alignment elements 106, 108. The distal edge 100 of the protruding element 90 extends into the pocket 110 between the alignment elements 106, 108 such that the protruding element 90 moves laterally within the pocket 110 as the gap 88 between the first and second lateral sections 80, 82 of the guard bar increases and decreases due to upward and downward flexing of the cutter bar assembly 24. Referring to FIGS. 9A and 9B, the stop feature 102 on the protruding element 90 is adapted to engage the inner edge 86B of the second lateral section 82 of the guard bar 56, thereby preventing the distal edge 100 of the protruding element 90 from engaging the lateral end 116 in the pocket 110 of the receiving element 104 during relative lateral movement between the first and second lateral sections 80, 82 of the guard bar 56.

Figure 12:
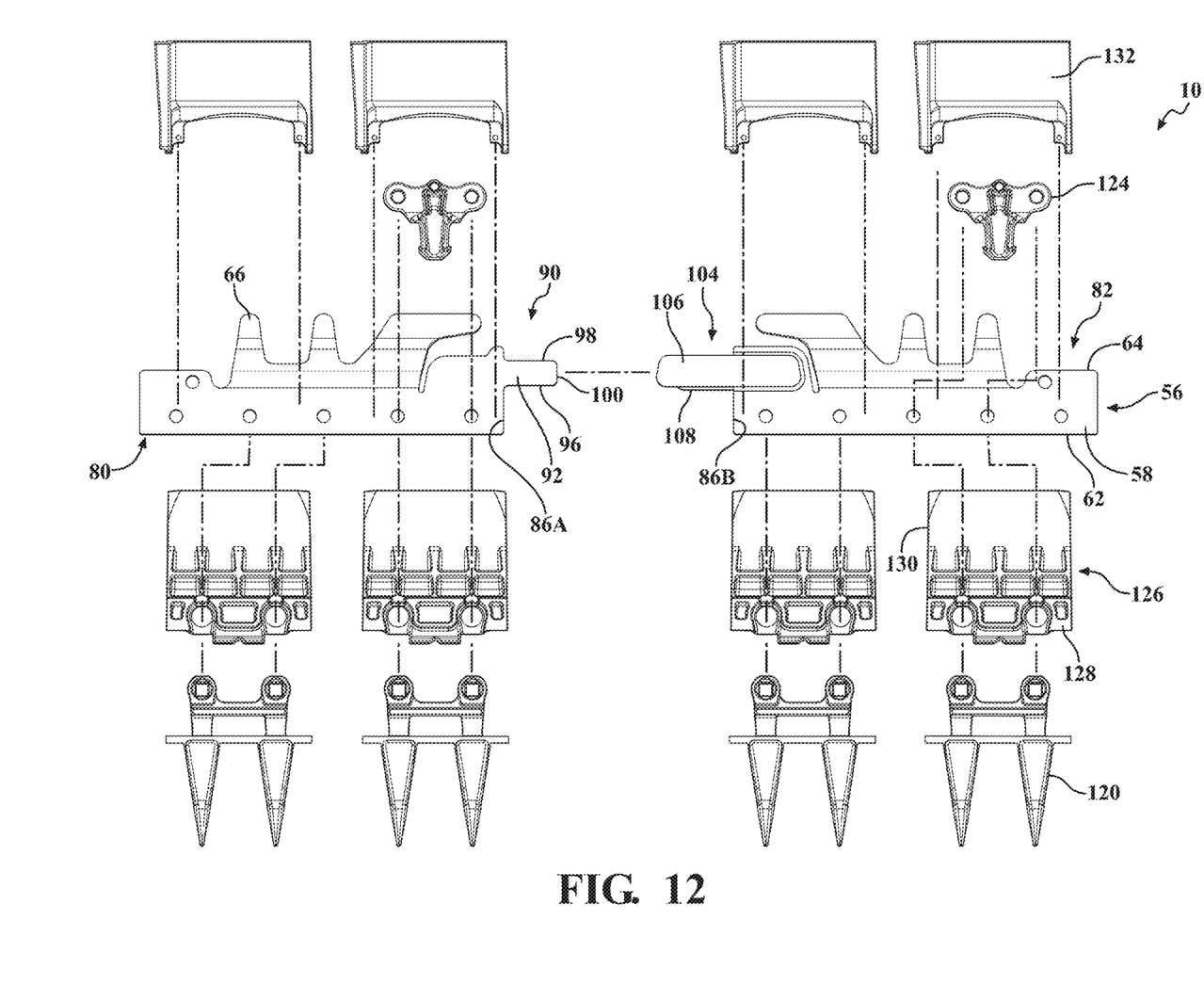
FIG. 12 is a fragmentary exploded view of the header of FIG. 1 showing various components of the cutter bar assembly, including the first and second lateral sections of the guard bar, the plurality of deflectors, hold-down elements, ground engaging members, and knife guards.

Referring to FIGS. 6 and 7, the cutter bar assembly 24 further includes a reciprocating sickle bar 118 and a plurality of knife guards 120 extending across the front portion 14 of the header frame 12 between the opposite ends 18 thereof for cutting the crops to be harvested. The plurality of knife guards 120 are fixedly secured to the bottom side 60 of the guard bar 56 and extend forwardly from the front edge 62 thereof. As shown in the Figures, the knife guards 120 may have a conventional single-piece pointed design, as shown in FIGS. 6, 7, and 12, or a conventional two-piece stub design, as shown in FIGS. 4 and 5, depending on the characteristics of the crops to be harvested. However, it is to be appreciated that both types of knife guards 120 perform a substantially similar function, and the header 10 may ultimately include any suitable type or style of knife guards 120, including a combination thereof, without varying the scope of the invention. Referring to FIG. 6, the sickle bar 118 is mounted to and extends longitudinally across the guard bar 56. The sickle bar 118 includes a plurality of knifes 122 fixedly secured thereto. As is known in the art, the sickle bar 118 reciprocates longitudinally between the opposite ends 18 of the header frame 12, thereby causing the knifes 122 on the sickle bar 118 to intersect with the plurality of knife guards 120 to cut the crops to be harvested. The cutter bar assembly 24 may also include a plurality of conventional hold-down elements 124 spaced across and fixedly coupled to the top side 58 of the guard bar 56, typically in embodiments of the header 10 that include knife guards 120 of the single-piece pointed design, as shown in FIGS. 7 and 12. The hold-down elements 124 are adapted to engage the sickle bar 118 for keeping the knifes 122 continuously intersecting with the plurality of knife guards 120 for cutting the crops to be harvested.

Referring to FIGS. 7, 11, and 12, the cutter bar assembly 24 further includes a plurality of ground engaging members 126 made of a low-friction, wear-resistant material, wherein each ground engaging member 126 has a top portion 128 and an opposite bottom portion 130. The top portions 128 of the ground engaging members 126 are mounted to the bottom side 60 of the guard bar 56. The bottom portions 130 of the ground engaging members 126 are adapted to engage the ground as the header 10 travels across the field, thereby preventing wear on the various components of the cutter bar assembly 24 and allowing the side wing sections 21 and the cutter bar assembly 24 to flex upwardly and downwardly to contour to the field for optimally cutting the crops. The support fingers 66 extending rearwardly and downwardly from the guard bar 56 engage and support the top portions 128 of the ground engaging members 126, as shown in FIG. 7, to prevent unintended movement thereof as the cutter bar assembly 24 engages the field. Referring to FIGS. 4 and 12, the cutter bar assembly 24 additionally includes a plurality of deflectors 132 fixedly coupled to the top side 58 of the guard bar 56. The deflectors 132 extend upwardly and rearwardly toward the support bar 36 to direct crops over the support bar 36 and away from the cutter bar assembly 24, thereby preventing unintended interference with cutting functions of the header 10.

Referring to its operation, the header 10 is mounted on the agricultural machine as is known in the art and travels with the agricultural machine along the field containing the crops to be harvested. As the header 10 travels with the agricultural machine along the field, the bottom portion 130 of the ground engaging members 126 engage the field for flexing of the cutter bar assembly 24 and pivoting of the side wing sections 21, thereby allowing the header 10 to contour to the field. When the header 10 encounters higher or lower portions of the field, the side wing sections 21 therefore pivot upwardly or downwardly relative to the middle frame section 20 and the cutter bar assembly 24 flexes upwardly or downwardly relative to the support bar 36 of the header frame 12. The first and second lateral sections 80, 82 of the guard bar 56 correspondingly flex upwardly or downwardly, causing the gap 88 therebetween to increase as the first and second lateral sections 80, 82 move laterally away from each other, as shown in FIGS. 9A and 9B, thereby preventing stretching of the guard bar 56. The protruding element 90 slides laterally within the recessed pocket 110 of the receiving element 104 between the upper and lower alignment elements 106, 108 thereof to maintain the horizontal alignment of the first and second lateral sections 80, 82 of the guard bar 56 as it flexes upwardly or downwardly. Similarly, when the header 10 returns to a level portion of the field, the cutter bar assembly 24 and the side wing sections 21 return to level relative to the generally vertical plane V. The gap 88 between the first and second lateral sections 80, 82 of the guard bar 56 correspondingly decreases as the first and second lateral sections 80, 82 move back toward each other, thereby preventing buckling of the guard bar 56. The protruding element 90 again slides laterally within the recessed pocket 110 of the receiving element 104 between the upper and lower alignment elements 106, 108 thereof to maintain the horizontal alignment of the first and second lateral sections 80, 82 of the guard bar 56.

When harvesting, the crops first engage the crop pick-up reel 32 and are cut by the sickle bar 118 as the knifes 122 intersect the knife guards 120, as is known in the art. Once cut by the sickle bar 118, the crops are deposited and arranged on the draper belt assembly 34 by the crop pick-up reel 32. The draper belt assembly 34 transports the cut crops medially to the aperture 23 in the rear wall 22 of the header frame 12 for further processing by the agricultural machine.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A header for use in a field to harvest agricultural crops, the header comprising:
    a header frame with a front portion and a rear portion, each extending laterally between opposite ends; and
    a cutter bar assembly coupled to the header frame, the cutter bar assembly flexible upwardly and downwardly relative to the header frame along a generally vertical plane between the opposite ends of the header frame for contouring to the field, the cutter bar assembly including
        a guard bar extending laterally across the front portion of the header frame between the opposite ends thereof, the guard bar split into at least a first lateral section and a second lateral section at a guard bar joint,
        wherein the first lateral section is operatively coupled to the second lateral section at the guard bar joint to horizontally align the first and second lateral sections of the guard bar between the opposite ends of the header frame while allowing relative lateral movement therebetween during upward and downward flexing of the cutter bar assembly,
        a reciprocating sickle bar slidably mounted to and extending longitudinally across the guard bar,
        a plurality of knife guards fixedly secured to the guard bar and intersecting with the sickle bar for cutting the crops to be harvested as the sickle bar reciprocates longitudinally between the opposite ends of the header frame,
        wherein the first and second lateral sections of the guard bar each terminate at an opposing inner edge adjacent to the guard bar joint, the inner edges defining a gap therebetween for allowing the first and second lateral sections of the guard bar to move laterally relative to each other during flexing of the cutter bar assembly, and
        wherein one of the first and second lateral sections includes upper and lower alignment elements extending laterally across the gap between the first and second lateral sections of the guard bar.

2. The header of claim 1 wherein the first lateral section includes a protruding element.

3. The header of claim 2 wherein the second lateral section includes a receiving element.

4. The header of claim 3 wherein the protruding element of the first lateral section is slidably received by the receiving element of the second lateral section at the guard bar joint to maintain horizontal alignment of the first and second lateral sections of the guard bar during relative lateral movement therebetween as the cutter bar assembly flexes upwardly and downwardly relative to the header frame.

5. The header of claim 4 wherein the receiving element further includes a recessed pocket extending from the inner edge of the second lateral section of the guard bar, the recessed pocket vertically bound by the upper and lower alignment elements.

6. The header of claim 5 wherein the protruding element includes top and bottom substantially planar sides extending laterally across the gap between the first and second lateral sections of the guard bar.

7. The header of claim 6 wherein the protruding element is slidably received by the receiving element such that the protruding element extends into the recessed pocket of the receiving element and the upper and lower alignment elements slidably engage the respective top and bottom sides of the protruding element.

8. The header of claim 7 wherein the header frame is divided into a middle frame section pivotally coupled between a pair of side wing sections for contouring of the header to the field.

9. The header of claim 8 wherein the header frame includes a support bar positioned behind the cutter bar assembly and extending across the header frame between the ends thereof.

10. The header of claim 9 wherein the support bar includes a plurality of fingers extending forwardly therefrom.

11. The header of claim 10 wherein the guard bar includes a plurality of hanger brackets fixedly coupled thereto, the plurality of hanger brackets adapted for receiving the plurality of fingers from the support bar for limiting upward and downward flexing of the cutter bar assembly relative to the header frame.

12. The header of claim 11 further comprising a plurality of deflectors fixedly coupled to the guard bar and extending upwardly and rearwardly toward the support bar to direct crops over the support bar and away from the cutter bar assembly.

13. The header of claim 12 further comprising at least one intermediate beam positioned behind and extending substantially parallel to the support bar.

14. The header of claim 13 further comprising a plurality of flexible mounting components extending between the at least one intermediate beam and the guard bar for further coupling the cutter bar assembly to the header frame and accommodating upward and downward flexing of the cutter bar assembly relative to the header frame.

15. The header of claim 14 wherein the sickle bar includes a plurality of knifes adapted for intersecting with the knife guards as the sickle bar reciprocates longitudinally between the opposite ends of the header frame for cutting the crops to be harvested.

16. The header of claim 15 further comprising a plurality of ground engaging members mounted to the guard bar for reducing wear on the guard bar as the cutter bar assembly engages the field during harvesting.

17. The header of claim 16 further comprising a plurality of support fingers extending rearwardly and downwardly from the guard bar for engaging and supporting the ground engaging members mounted to the guard bar.

18. The header of claim 17 further comprising a plurality of hold-down elements operatively coupled to the guard bar for engaging the sickle bar to keep the sickle bar continuously intersecting with the plurality of knife guards for cutting the crops to be harvested.

19. The header of claim 18 further comprising a plurality of support legs extending between the front and rear portions of the header frame and spaced apart between the opposite ends of the header frame.

20. The header of claim 19 further comprising a rear wall extending substantially vertically from the rear portion of the header frame between the opposite ends thereof, the rear wall including an aperture for transferring cut crops from the header.

21. The header of claim 20 further comprising a draper belt assembly rotatably supported by the header frame for transporting crops cut by the cutter bar assembly to the aperture in the rear wall.

22. The header of claim 21 further comprising at least one crop pick-up reel operatively coupled to the header frame for engaging the crops to be harvested.

* * * * *